United States Patent [19]
Rose et al.

[11] 3,759,368
[45] Sept. 18, 1973

[54] EGG PROCESSING APPARATUS
[75] Inventors: Boyd W. Rose; George W. Thornton, both of Riverside, Calif.
[73] Assignee: FMC Corporation, San Jose, Calif.
[22] Filed: Mar. 13, 1972
[21] Appl. No.: 234,001

[52] U.S. Cl. .................................... 198/76, 222/56
[51] Int. Cl. .................................................. B65g 37/00
[58] Field of Search ................ 198/37, 82, DIG. 19, 198/76; 222/56

[56] References Cited
UNITED STATES PATENTS
2,745,537   5/1956   Cadman ............................. 198/37 X
3,279,423   10/1966   Russell ............................... 198/37 X

Primary Examiner—Edward A. Sroka
Attorney—F. W. Anderson et al.

[57] ABSTRACT

Egg processing apparatus wherein eggs are conveyed from an egg loading station through a washer apparatus to and through an egg accumulation device to a plurality of egg processing machines, such as egg breaking machines, which are each subject to temporary interruption of their operation from time to time. The apparatus includes means for regulating the accumulation of eggs by the accumulation device and means for controlling the movement of the conveyor that conveys the eggs to the accumulation device so that eggs may be delivered to any operative egg processing machine during such times one or more of the other egg processing machines is inoperative.

8 Claims, 9 Drawing Figures

FIG_1

Patented Sept. 18, 1973

Patented Sept. 18, 1973

FIG_8

EGG PROCESSING APPARATUS

BACKGROUND OF THE INVENTION

1. Field of the Invention

The present invention pertains in general to egg processing equipment and more particularly to egg processing equipment for conveying eggs to and through an egg accumulation device so that eggs may be conveyed to a plurality of egg processing machines, such as egg breaking machines, which may individually become inoperative from time to time.

2. Description of the Prior Art

The various kinds of equipment currently used for washing and breaking eggs are such that the amount of manual labor involved in the operation is rather expensive. In one particular plant installation containing equipment for washing and breaking eggs, the egg washing apparatus and the egg breaking apparatus have been separate and unconnected pieces of equipment and have been somewaht uneconomical to operate primarily because of the number of operators necessary for each piece of equipment. Thus, for example, in the operation of said installation it was the practice to have a first operator place flats of eggs onto the infeed conveyor of an egg washing apparatus wherein the eggs were washed while retained on the flats and to have a second operator remove the flats of washed eggs from the egg washer apparatus and transport the flats with eggs to one or more apparatus for breaking the eggs. The eggs on the flats were then manually removed from the flats by the use of a portable, hand operated, vacuum egg lifter and placed onto the infeed trays of each egg breaking apparatus. The eggs placed on each infeed tray were then conveyed on a system of conveyors and ultimately conveyed in single file on a single lane conveyor to the rotatable carrousel of an egg breaking apparatus which carrousel is provided with devices that held the egg shells as they were cracked. The contents of each cracked egg were then deposited in the cups of another rotatable carrousel which transported them to a point where they were ultimately collected. In addition to the operators already mentioned, other operators are employed to supervise and control the operation of each egg cracking apparatus. For the sake of economy and efficiency it is desirable to reduce the expense of operating this type of equipment by reducing the amount of human labor required to operate it.

SUMMARY OF THE INVENTION

The present invention provides egg processing equipment adapted to convey eggs to a plurality of simultaneously operable egg processing machines.

The present invention more particularly provides equipment that may be used to convey eggs to a plurality of simultaneously operable egg processing machines, such as egg breaking machines, by conveying eggs from an egg source through an egg accumulation device to respective conveyors adapted to convey eggs to such egg processing machines.

An advantage obtained by the use of the present invention is that it is possible to bring the operation of one or more of several egg processing machines to a temporary stop without also necessarily halting the movement of all of the conveyors that are utilized to convey eggs to the machines. Another advantage obtained by the use of the present invention is that it is possible to continue the operation of some of the egg processing machines when one or more of the machines is rendered inoperative.

The abovenoted advantages of the present invention are attained by the use of an egg accumulation device, which, in accordance with the teachings of the present invention, may be arranged between an egg washer apparatus and various egg breaking machines that are utilized in a specific application of the present invention. This device accumulates eggs conveyed thereto and distributes the accumulated eggs to conveyors, such as the conveyors that are utilized to convey eggs to egg breaking machines. These conveyors may be operative or inoperative at various undetermined times. The advantages of the present invention are further achieved by the use of an apparatus control means associated with the egg accumulation device for controlling the movement of the conveyor that conveys eggs to the device and correlating this movement with the movement of the various conveyors that convey eggs from the egg accumulation device.

The equipment provided by the present invention includes a conveyor system for conveying eggs to and through the egg accumulation device in such a way that the stoppage of movement of the various conveyors arranged to convey eggs from the device will not necessarily require stoppage of the movement of the conveyor arranged to convey eggs to the device. The equipment includes means for slowing or stopping the movement of the conveyor for conveying eggs to the device in accordance with the extent of egg accumulation by the device at any particular time. In accordance with the present invention the means for accomplishing this desired result includes a switch means associated with the device for sensing certain predetermined accumulations of approximate numbers of eggs at the time when such accumulations occur so as to cause either temporary reduction in speed of movement or temporary stoppage of movement of the conveyor utilized to deliver eggs to the device.

It is accordingly an object of the present invention to provide egg processing equipment or apparatus adapted to convey eggs from a source of eggs to and through an egg accumulation device to a plurality of egg processing machines, such as egg breaking machines, which are each subject to operation stoppage from time to time.

It is another object of the present invention to provide the apparatus of the kind described herein with an apparatus control means associated with an egg accumulation device and operable to automatically regulate the speed of movement of the conveyor transporting eggs to the device in relation to the occasionally interrupted movement of conveyors transporting eggs from the device to various egg processing machines.

It is another object of the present invention to provide an apparatus wherein the accumulation of eggs by an egg accumulation device is regulated so that the device will accumulate or store an accumulation of eggs sufficient to provide a continual supply of eggs to a plurality of egg processing machines that may be connected by conveyors to the device.

The above and other objects of the present invention, as well as advantages and features of the invention, will be made more clear upon review of the following discussion of an embodiment of the present invention taken in conjunction with the accompanying drawings.

DESCRIPTION OF THE PREFERRED EMBODIMENT

Figure 1:
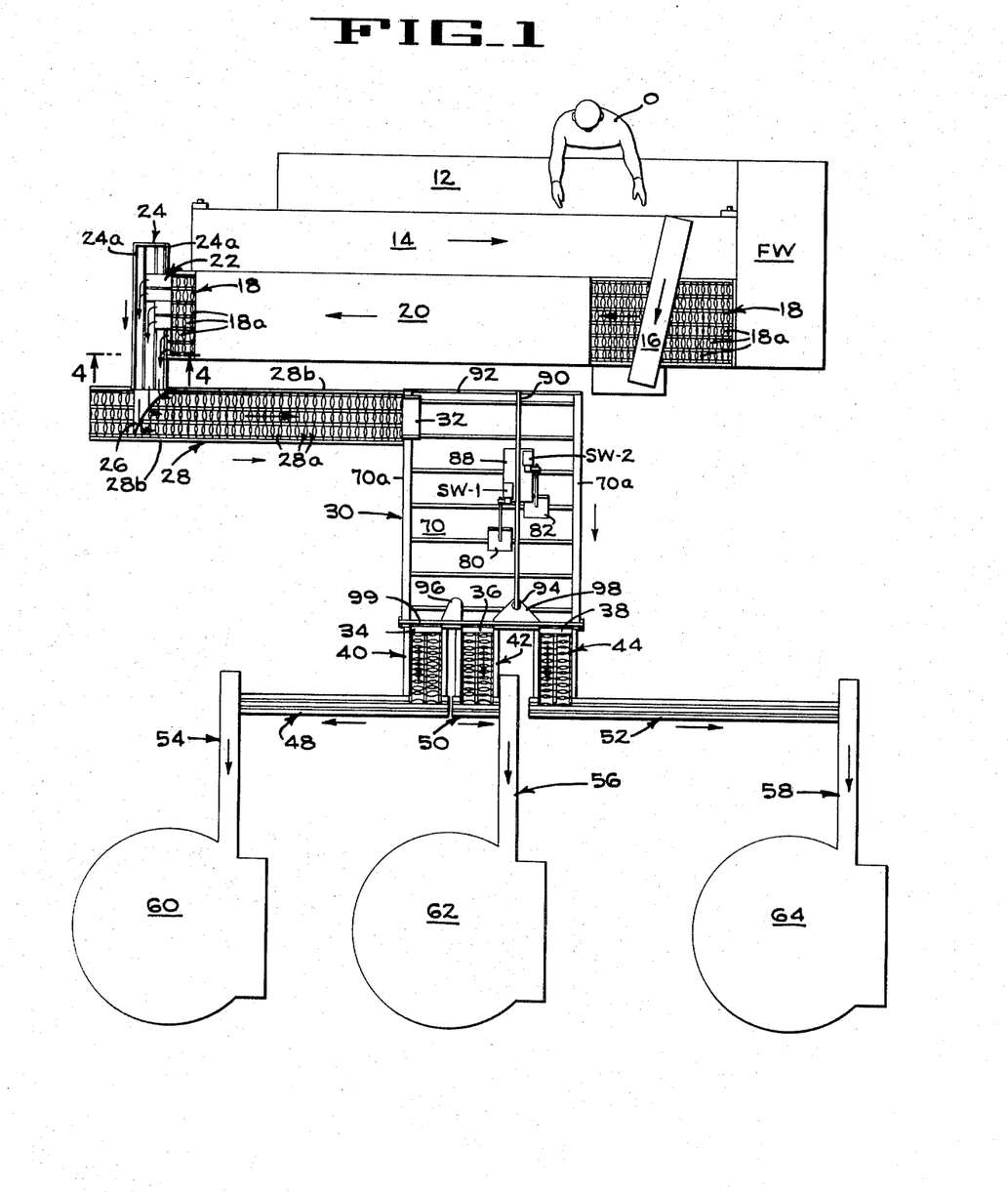
FIG. 1 is a diagrammatic plan of an egg processing system which utilizes the apparatus of the present invention.

FIG. 1 is a diagrammatic plan of an egg processing system which embodies the present invention. The system includes conveyors for moving eggs to a plurality of egg breaking machines. The system includes a work station where an operator O removes flats of eggs from field cases situated on a shelf 12 and places the flats on an infeed conveyor 14. The infeed conveyor 14 moves the egg loaded flats in index fashion to an egg transfer mechanism 16 where the mechanism transfers the eggs from the flats onto a roller conveyor 18. The conveyor 14 moves the empty flats into a flat washer apparatus FW.

The conveyor 18 carries the eggs which have been transferred from the transfer mechanism 16 through an egg washer apparatus 20. Eggs are transported six abreast on the conveyor 18 through the apparatus 20 to a six lane ramp 22. The ramp 22 feeds six lanes of eggs to a triple lane conveyor 24. Each lane of the conveyor 24 receives eggs from two respective lanes of the ramp 22 (see FIG. 4). Each conveyor lane of conveyor 24 carries a lane of eggs in single file to an egg feedout ramp 26 which feeds the eggs to a roller conveyor 28 and distributes them evenly thereacross. Eggs are transported three abreast on the conveyor 28.

The conveyor 28 carries the eggs up an inclined path to the inlet of an egg accumulation device 30. The device 30 includes three outlets. Eggs that have been carried to the device inlet are moved to the device outlets in a manner to be later described. The device 30 includes a ramp inlet 32 and three ramp outlets 34, 36 and 38. The ramp outlet 34 feeds two lanes of eggs to a roller conveyor 40, the ramp outlet 36 feeds two lanes of eggs to a roller conveyor 42, and the ramp outlet 38 feeds two lanes of eggs to a roller conveyor 44. Eggs are therefore carried two abreast by each of the conveyors 40, 42 and 44. The conveyor 40 carries eggs to a single lane conveyor 48, the conveyor 42 carries eggs to a single lane conveyor 50, and the single lane conveyor 44 carries eggs to a single lane conveyor 52. The conveyor 48 carries a lane of eggs in single file to a conveyor 54 of an egg breaking machine 60, the conveyor 50 carries a lane of eggs in single file to a conveyor 56 of an egg breaking machine 62, and the conveyor 52 carries a lane of eggs in single file to a conveyor 58 of an egg breaking machine 64. Each conveyor 54, 56 and 58 carries a lane of eggs in single file to the egg breaking machine to which it is connected.

The machines 60, 62 and 64 can be purchased from Sanovo Incorporated, 10 East 40th St., New York, N.Y. The machines are identical. Each machine is identified as a SANOVO fully automatic Egg Breaking and Separating Machine, Model 40. This model can be operated to break 7,200 to 8,400 eggs per hour when operated so as to break eggs and separate egg yolks from egg whites. This model can also be operated to break 8,000 to 10,000 eggs per hour when used to break eggs without separating the egg yolks from the egg whites.

The flatwasher FW is similar to the flatwasher illustrated in Rose et al U.S. Pat. No. 3,583,414. The conveyor 14, the transfer mechanism 16, the conveyor 18, and the washer apparatus 20 are similar to like components illustrated in Rose U.S. Pat. No. 3,252,607.

The accumulation device 30 (FIG. 2) includes a horizontal deck 70 on which eggs may gather. Side panels 70a disposed on opposite sides of the deck 70 are provided to confine eggs on the deck. The accumulation device includes a slat conveyor with spaced slats 72 for moving eggs away from the ramp inlet 32 toward the ramp outlets 34, 36 and 38. Each slat 72 moves over the deck surface to push, roll and slide eggs toward the ramp outlets. Each slat is able to pass under eggs gathered on the deck 70 near the ramp outlets if the eggs are stopped and prevented from moving over the ramp outlets.

The slats 72 are each connected to two endless link chain belts 74 (See FIGS. 5 and 6), situated under the side panels 70a, that move to carry the slats across the deck from the end of the deck near the ramp inlet 32 to the end of the deck near the ramp outlets 34, 36 and 38. The respective slats are connected at opposite ends thereof to respective links 76 of each link chain belt 74.

The system includes an apparatus control mechanism for controlling the extent of egg accumulation on the deck 70 during operation of the system. The number of eggs gathered or accumulated at any time on the deck 70 during the system operation depends on the rate of egg delivery through the ramp inlet 32 to the deck 70 and the rate of egg delivery from the deck 70 through the egg outlets 34, 36 and 38. The control mechanism functions to correlate the rate of egg delivery to the deck with the rate of egg delivery from the deck.

Figure 2:
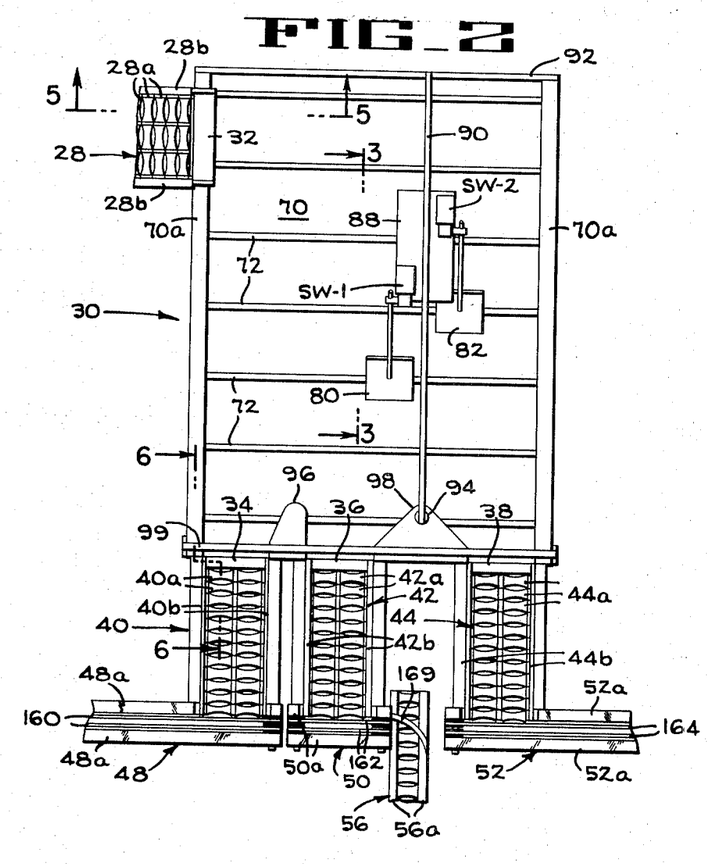
FIG. 2 is an enlarged plan of a portion of the system shown in FIG. 1.
Figure 3:
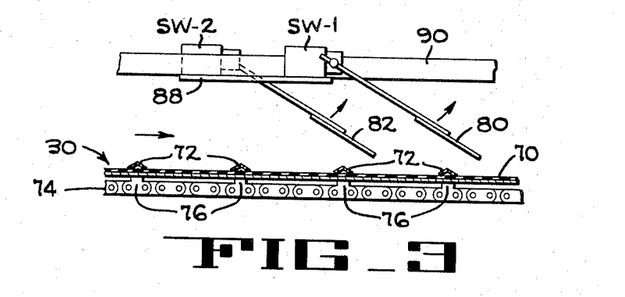
FIG. 3 is an enlarged section taken along the line 3—3 of FIG. 2 particularly illustrating the switch means suspended over the deck of the egg accumulation apparatus.

The control mechanism includes two paddles 80 and 82 suspended above the deck 70 in the manner shown in FIGS. 2 and 3. Each paddle 80, 82 is rigidly attached to an arm that is connected to the pivotable actuating arm of a respective limit switch SW–1, SW–2. Each paddle 80, 82 is typically about three times as wide as an egg is long. The paddles 80, 82 are suspended from the switches SW–1, SW–2 so that each paddle is disposed at an angle to the deck as shown in FIG. 3. The sides of the paddles that face toward the deck also face toward the end of the deck where the ramp inlet 32 is located. The vertical distance between the lower edge of each paddle and the underlying deck surface is less than the width of an egg. Thus, some of the eggs on the deck moving away from the ramp inlet will move into contact with a paddle as the eggs are moved toward the ramp outlets. The paddles are attached to pivotable arms and therefore can be pushed away from the deck by eggs passing under the paddles. Each time the paddle 80 or the paddle 82 is pushed upward, the arm to which the paddle is attached pivots to close the associated switch SW-1 or SW-2. The switches SW-1 and SW-2 are connected in a motor control circuit which is switch controlled to determine the speed of movement of the conveyors 14, 18, 24 and 28 in a manner to be explained hereinafter.

Eggs can pass under the paddles 80, 82 in about a second. Each time an egg moves under a paddle to push the paddle upward and pivot the paddle supporting arm upward, the switch (SW-1 or SW-2) connected to the paddle closes and remains closed until the egg moves beyond the paddle toward the ramp outlets. As soon as an egg moves beyond a paddle and out of contact therewith, the paddle supporting arm can pivot downward to thereby reopen the switch connected therewith. As will be explained, the actuation of the paddles to close the switches SW-1 or SW-2 will not result in an alteration in the speed of movement of the conveyors 14, 18, 24 and 28 unless the paddles are actuated for a minimum time interval which is greater than the time it normally takes for an egg to move into and out of contact with the paddles.

The switches SW-1 and SW-2 are both supported on top of a horizontal plate 88 secured to the underside of a rail 90 that extends along the length of the deck 70. The rail 90 is secured at one end to a horizontal bar 92 and at its other end to the top of a vertical post 94 so that the rail is disposed above the deck as shown in FIG. 3. The bar 92 is secured to the side panels 70a at the inlet end of the accumulator device.

As shown in FIG. 2, the accumulator device 30 includes at its downstream end vertical divider walls 96, 98 made of sheet metal. These divider walls are secured to a horizontal bar 99 that is secured to the side panels 70a. The divider walls 96, 98 are situated over respective portions of the deck so that the slats 72 can move under the divider walls (FIG. 6) and return under the deck to the end of the deck where the ramp inlet is located. The divider walls 96, 98 serve to guide eggs to the ramp outlets 34, 36 and 38. The bar 99 and divider walls 96, 98 are shown and described as being stationary members but it is possible to secure such divider walls to a pivoted wall oscillating mechanism, not shown, for oscillating the walls in a horizontal plane in order to facilitate the movement of eggs to the ramp outlets 34, 36 and 38. When such a mechanism is utilized the walls 96, 98 are oscillated back and forth in small movements toward the side panels 70a.

Figure 4:
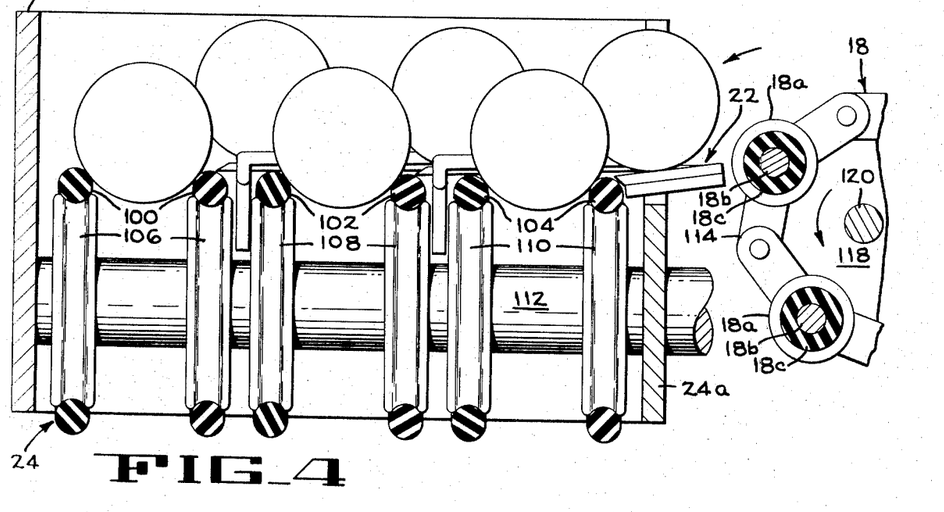
FIG. 4 is an enlarged section taken along the line 4—4 of FIG. 1.

The triple lane conveyor 24 includes side panels 24a (FIG. 4) and three pairs of endless rubber belts 100, 102 and 104 for carrying eggs from the ramp 22 to the ramp 26. The belts 100, 102 and 104, as shown in FIG. 4, are of circular cross section. The belts are trained at their upstream ends around three pulleys 106, 108 and 110 that are secured to a rotatable shaft 112. The shaft 112 is supported by the side panels 24a in such a way that it can rotate. The belts 100, 102 and 104 extend from the pulleys 106, 108 and 110 to three similar pulleys located adjacent to the ramp 26. The pulleys near the ramp 26 are secured to a rotatable shaft, similar to the shaft 112, which is supported in such a way that it can rotate.

The roller conveyor 18 includes two laterally spaced endless link chain belts which support the rollers of the conveyor. The chain belts are trained around respective sprockets on rotatable shafts at opposite ends of the conveyor 18. The conveyor 18 has rollers 18a that are contoured to define six egg receiving pockets between each pair of adjacent rollers. Each roller 18a includes, as shown in FIG. 4, a metal shaft 18b and a contoured plastic tubular sleeve 18c. Each plastic sleeve 18c includes six sleeve portions of reduced diameter which cooperate with similar portions on the adjacent rollers of the conveyor 18 to define the aforementioned egg receiving pockets. The rollers 18a all are rotated in the same direction as they are moved by the aforementioned chain belts toward the ramp 22. The rollers are rotated by providing two flat rods, not shown, beneath the upper run of the rollers 18a. These rods are disposed below the opposite ends of each roller sleeve 18c in the upper run of the conveyor 18. The sleeves 18c roll along the length of the rods as the rollers move away from the shaft mounted sprockets at the end of the conveyor near the flatwasher FW toward the shaft mounted sprockets disposed at the end of the conveyor near the ramp 22. The rotation of the rollers 18a causes eggs disposed in the pockets between the rollers to rotate as the eggs travel through the egg washer 20 so that the eggs may be thoroughly washed, brushed, and dried before reaching the ramp 22.

The transfer mechanism 16, shown in FIG. 1, deposits eggs into the pockets formed by the rollers 18a. The rollers 18a are moved by the chain belts 114 to carry the eggs to the end of the conveyor 18 near the ramp 22. As each roller completes its upper run movement, it deposits six eggs onto the ramp 22 and continues around the sprockets 118 to begin its lower run movement toward the sprockets at the other conveyor end. The ramp 22 discharges eggs two at a time into each lane of the conveyor 24. The eggs discharged to the lanes of the conveyor rest on the belts, as shown in FIG. 4, for transport by the belts to the ramp 26. Due to the manner in which the eggs are delivered to the belts 100, 102 and 104 the eggs in each lane of eggs moving from the ramp 22 are uniformly spaced.

The belts 100, 102 and 104 carry three lanes of eggs to the ramp 26 where the eggs are moved from the belts onto the ramp. The eggs move over the ramp from the discharge end of the conveyor 24 to the rollers of the conveyor 28.

Figure 5:
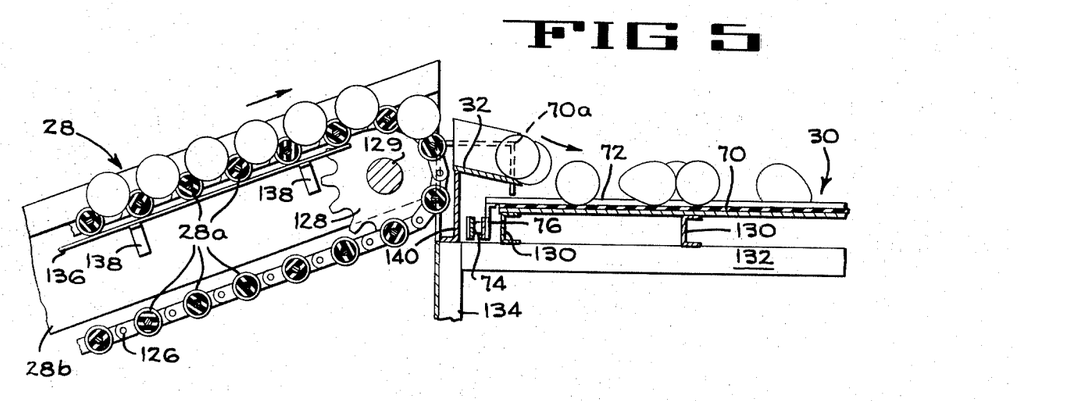
FIG. 5 is an enlarged section taken along the line 5—5 of FIG. 2 particularly illustrating the delivery of eggs from the infeed conveyor to the inlet of the egg accumulation apparatus.

The conveyor 28, which is similar to the conveyor 18, includes rollers 28a (FIG. 5) with contoured tubular sleeves that define three egg receiving pockets between adjacent rollers 28a. The rollers 28a carry eggs, three abreast, from the ramp 26 to the ramp inlet 32 for the accumulator device 30. When the eggs reach the ramp inlet 32 they move from the rollers 28a over the ramp 32 and onto the deck 70 of the accumulator device 30. The rollers 28a are connected between two opposed endless link chain belts 126 that are trained around sprockets 128 on respective rotatable shafts 129 at the respective ends of the conveyor 28, with one such chain belt and shaft only being shown in FIG. 5. The conveyor 28 includes side panels 28b (see FIGS. 1 and 5). A flat rod 136 is attached to the inside of each side panel 28b by brackets 138 (FIG. 5). The rods 136 are disposed below the opposite ends of each roller 28a in The upper run of the conveyor 28. The rollers 28a roll along the length of each rod 136 as the rollers move toward the ramp inlet 32. The rotation of the rollers 28a causes eggs disposed in the pockets between the rollers to rotate as the eggs travel toward the ramp inlet 32.

As is seen in FIG. 5, the deck 70 includes a metal plate which is covered with a plastic sheet to provide a smooth and somewhat resilient surface upon which the eggs can roll. The deck 70 is supported on longitudinally extending channel beams 130 disposed on a support frame including a plurality of horizontal members 132 and a plurality of vertical members 134 (one pair of members 132 and 134 only being shown in FIG. 5). The side panels 70a of the accumulator device 30 are disposed above the upper runs of the chain belts 74 of the device. A portion of one of the side panels 70a can be cut out, as shown in FIG. 5, to provide an opening in which the ramp inlet 32 is disposed. The ramp inlet 32 can be supported on one of the horizontal members 132 by a bracket 140 that secures the ramp inlet at an elevation so that eggs gravitate thereon from conveyor 28 without dropping over too great a distance. The shaft 129 shown in FIG. 5 can be supported by the side panels 28b so that the shaft can rotate to turn each sprocket 128. The two endless chain belts 74 which carry the slats 72 are supported by conventional sprockets 144 (one only being shown in FIG. 6) and are adpated to be driven at their downstream ends by a drive shaft 146.

Figure 6:
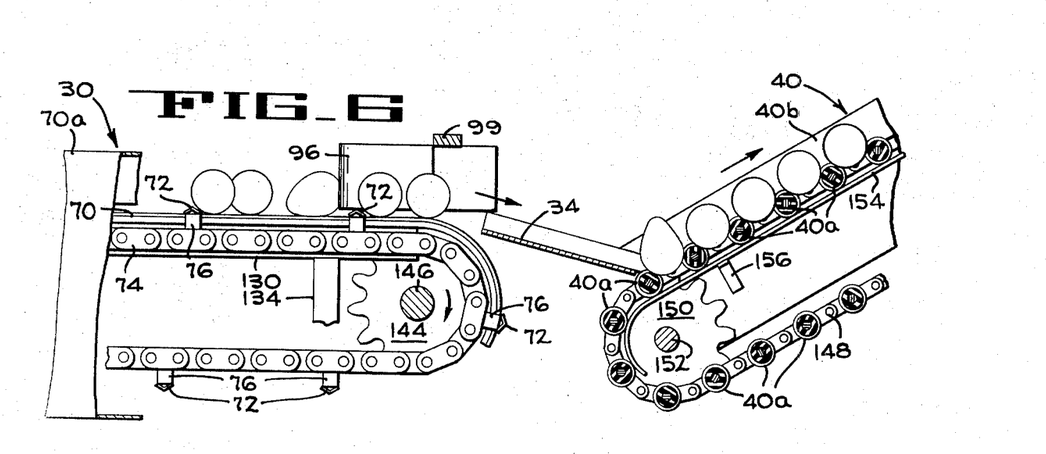
FIG. 6 is an enlarged section taken along the line 6—6 of FIG. 2 and particularly illustrating the delivery of eggs from the outlet of the egg accumulation apparatus.

FIG. 6 illustrates how eggs are moved from the deck 70 by the slats 72 to the outlets of the accumulator device 30 and illustrates, in particular, how eggs are moved from the deck 70 over the ramp outlet 34 to the conveyor 40. The ramp outlet 34 is disposed as shown in FIG. 6 by suitable support means (not shown). The divider walls 96, 98 (see FIGS. 2 and 6) guide eggs on the deck 70 to the ramp outlets 34, 36 and 38 and are spaced from each other and from the side panels 70a so that eggs are fed two at a time to each of the conveyors 40, 42 and 44. Eggs brought to the ramp outlet 34, for example, move two at a time over the ramp outlet 34 and onto the conveyor 40 as the slats 72 travel under the divider walls 96, 98. The conveyors 40, 42 and 44 include rollers 40a, 42a and 44a (see FIG. 2) with sleeves that are contoured to define two egg receiving pockets between adjacent rollers. The conveyors 40, 42 and 44 are similar to each other and similar to the conveyor 28. The rollers 40a of the conveyor 40 are interconnected between two link chain bolts 148 that are trained about sprockets 150 on rotatable shafts 152 supported at respective ends of the conveyor 40 in the manner shown in FIG. 6. The conveyor 40 includes side panels 40b disposed above the link belts 148. The rollers 42a of the conveyor 42 and the rollers 44a of the conveyor 44 are interconnected between two link chain belts similar to the chain belts 148. The chain belts of the conveyors 42 and 44 are trained about sprockets on rotatable shafts at respective ends of the conveyors 42 and 44 in the same manner as the chain belts 148 of the conveyor 40 are trained about the sprockets 150 on a shaft 152. The conveyors 42 and 44 include side panels 42b and 44b (see FIG. 2) similar to the side panels 40b.

The conveyor 40 includes two flat rods 154 secured by brackets 156 to the inside of the respective side panels 40b. The rods 154 are disposed below the opposite ends of each roller 40a in the upper run of the conveyor 40. The rollers 40a roll along the length of each rod as the rollers move toward the conveyor 48. The rollers 40a thereby cause eggs disposed in the pockets between the rollers to rotate as the eggs travel toward the conveyor 48. The conveyors 42 and 44 include similar rods over which the rollers 42a and 44a roll to rotate eggs traveling on the conveyors 42 and 44 to the conveyors 50 and 52, respectively.

The conveyors 48, 50 and 52 are, as seen in FIGS. 1 and 2, similar to each other and are each comprised of single lane conveyors similar to the single lane conveyors comprising conveyor 24. Each conveyor 48, 50 and 52 includes a pair of endless rubber belts 160, 162 and 164, respectively, which are circular in cross section. The belts of each conveyor 48, 50 and 52 carry a single lane of eggs in single file to the respective conveyors 54, 56 and 58 in the same way that the belts 100, 102 or 104 carry a single lane of eggs in single file to the ramp 26. The belts of each conveyor 48, 50 and 52 are trained around respective pulleys on respective rotatable shafts disposed at opposite ends of each such conveyor. The conveyor 48 includes sheet metal panels 48a, the conveyor 50 includes sheet metal panels 50a and the conveyor 52 includes sheet metal panels 52a, as indicated in FIG. 2, to prevent eggs from moving off of the belts. The panels 48a are arranged above opposite sides of the belts 160, the panels 50a are arranged above opposite sides of the belts 162 and the panels 52a are arranged above opposite sides of the belts 164. The panels 48a, 50a and 52a respectively slant downwardly and inwardly toward the respective belts 160, 162 and 164 to form respective sheet metal troughs through which the belts 160, 162 and 164 carry eggs to the respective conveyors 54, 56 and 58 of the egg breaking machines. A portion of one of the panels 48a is cut out, as indicated in FIG. 2, to provide an opening through which eggs coming from the conveyor 40 can pass. Similarly, a portion of one of the panels 50a and a portion of one of the panels 52a is cut out, as indicated in FIG. 2, to provide respective openings through which eggs coming from the conveyors 42 and 44 can pass. Eggs carried by the rubber belts 162 are directed to the feed-in end of the egg breaking machine conveyor 56 by a diverter strip 169 shown in FIG. 2. Eggs carried by the rubber belts 160 and 164 are similarly directed to their respective egg breaking machine conveyors by diverter strips (not shown) similar to the diverter strip 170.

The egg breaking machine conveyors 54, 56 and 58, which are diagrammatically shown in FIG. 1, are similar in construction to the conveyor 18 except that they are each designed to carry only a single lane of eggs. Each of the conveyors 54, 56 and 58 includes two laterally spaced endless link chain belts which support rollers. The chain belts of each of these conveyors are trained around respective sprockets on rotatable shafts at opposite ends of the respective conveyors. Each conveyor 54, 56 and 58 has rollers with tubular sleeves that are contoured to define one egg receiving pocket between adjacent rollers. As is indicated in FIG. 2, the conveyor 56 includes side panels 56a disposed above the chain belts of the conveyor 56 and rollers 56b defining an egg receiving pocket between each pair of adjacent rollers. The conveyors 54 and 58 similarly include side panels disposed above the chain belts thereof and also include rollers defining an egg receiving pocket between each pair of adjacent rollers. The conveyors 48, 50 and 52, respectively, can deliver an egg into each egg receiving pocket of the associated respective conveyors 54, 56 and 58, and the respective speeds of the conveyors are such that each pocket in the conveyors 54, 56 and 58 will receive an egg if the delivery of eggs from conveyors 40, 42 and 44 is maintained.

The egg processing system disclosed includes circuitry to operate the egg washer apparatus 20, the egg transfer mechanism 16, the slat conveyor of the egg accumulation device 30, and the various conveyors 14, 18, 24 and 28. This circuitry is diagrammatically shown in FIGS. 7 and 8.

Figure 7:
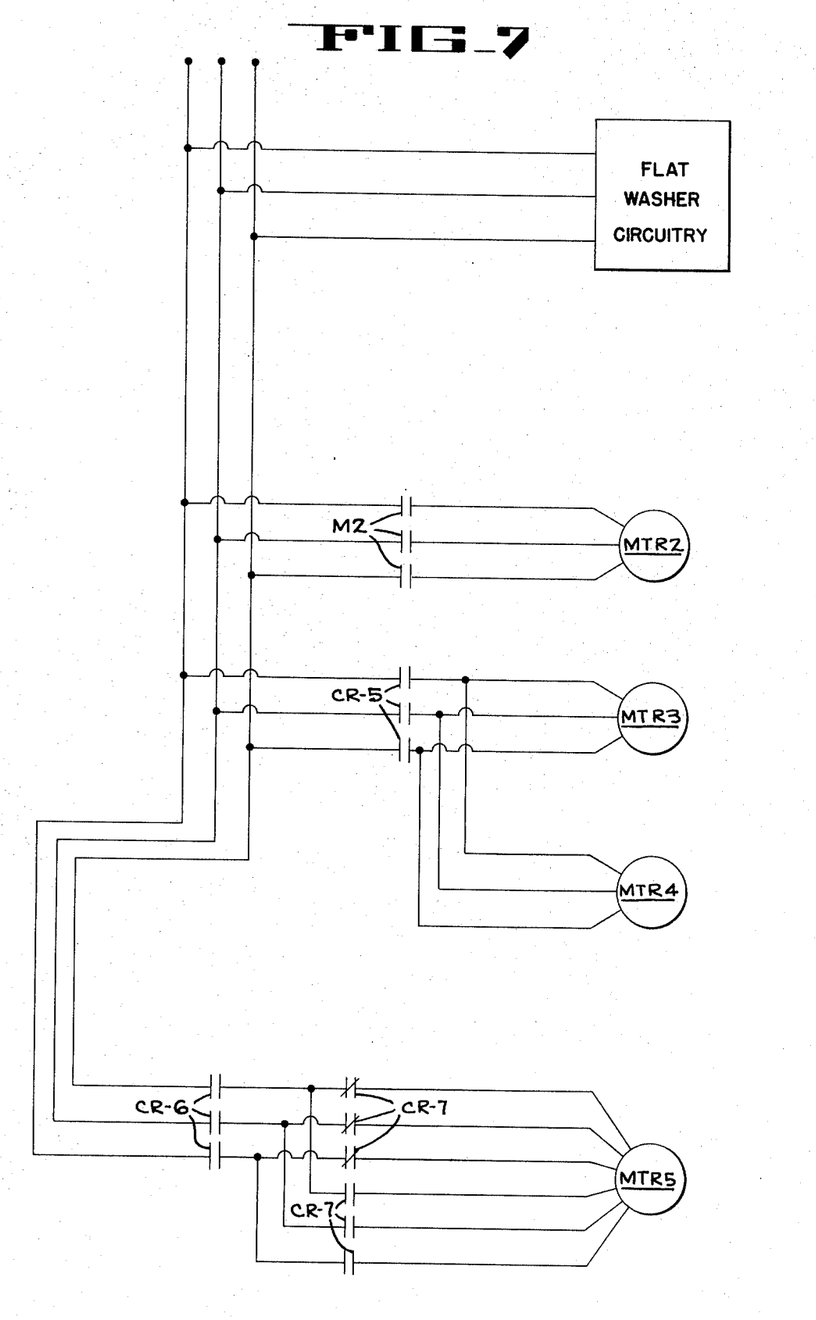
FIG. 7 is a schematic representation of the power circuitry for the apparatus of the present invention.

FIG. 7 is an electrical diagram of an apparatus power circuit which includes motors MTR2, MTR3, MTR4 and MTR5 and the flat washer circuitry FW–CKTRY. The various motors and the flat washer circuitry are each supplied with power by three power lines which are energized by a 220 volt, three phase, 60 cps power supply. Power circuit control relay contacts M–2, CR–5, CR–6, and CR–7 are connected in respective power branch lines to control the operation of the motors MTR2 . . . MTR5.

Figure 8:
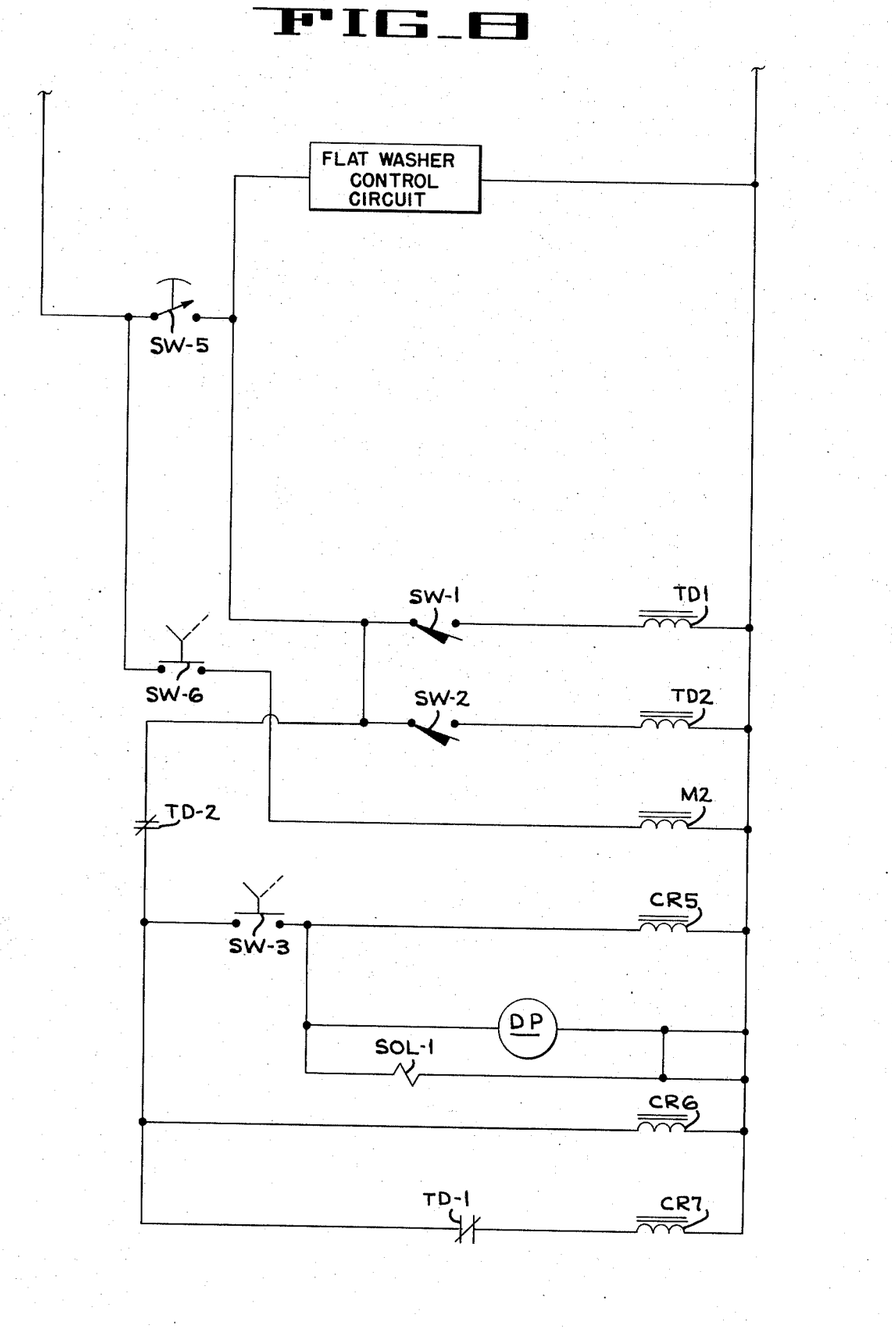
FIG. 8 is a schematic representation of the control circuitry for the apparatus of the present invention.

The apparatus control system shown in the circuit diagram of FIG. 8 includes the following system components: a flat washer control circuit that controls the operation of the flat washer apparatus FW; a relay coil M2 that controls the relay contacts M–2 (see FIG. 7); a time delay relay coil TD1 that controls a relay contact TD–1; a time delay relay coil TD2 that controls a relay contact TD–2; a relay coil CR5 that controls relay contacts CR–5 (see FIG. 7); a detergent pump DP; a solenoid coil SOL–1; a relay coil CR6 that controls relay contacts CR–6 (see FIG. 7); a relay coil CR7 that controls relay contacts CR–7 (see FIG. 7); switch SW–1 controlled by the paddle 80; switch SW–2 controlled by the paddle 82; an off-on switch SW–3 that controls the operation of the egg washer apparatus; an off-on switch SW–5; and an off-on switch SW–6.

The relay including the relay coil TD1 and relay contacts TD–1 and the relay including the relay coil TD2 and relay contacts TD–2 are relays whose respective relay contacts TD–1, TD–2 are normally closed and will open only after their respective relay coils TD1, TD2 have been continuously energized for a predetermined time interval. Each of these relays can be adjusted to set the desired time interval. In the operation of the egg processing system disclosed, each relay is adjusted so that the coil thereof must be continuously energized for a time interval of about 5 seconds before the relay contacts TD–1 or TD–2 will open.

Figure 9:
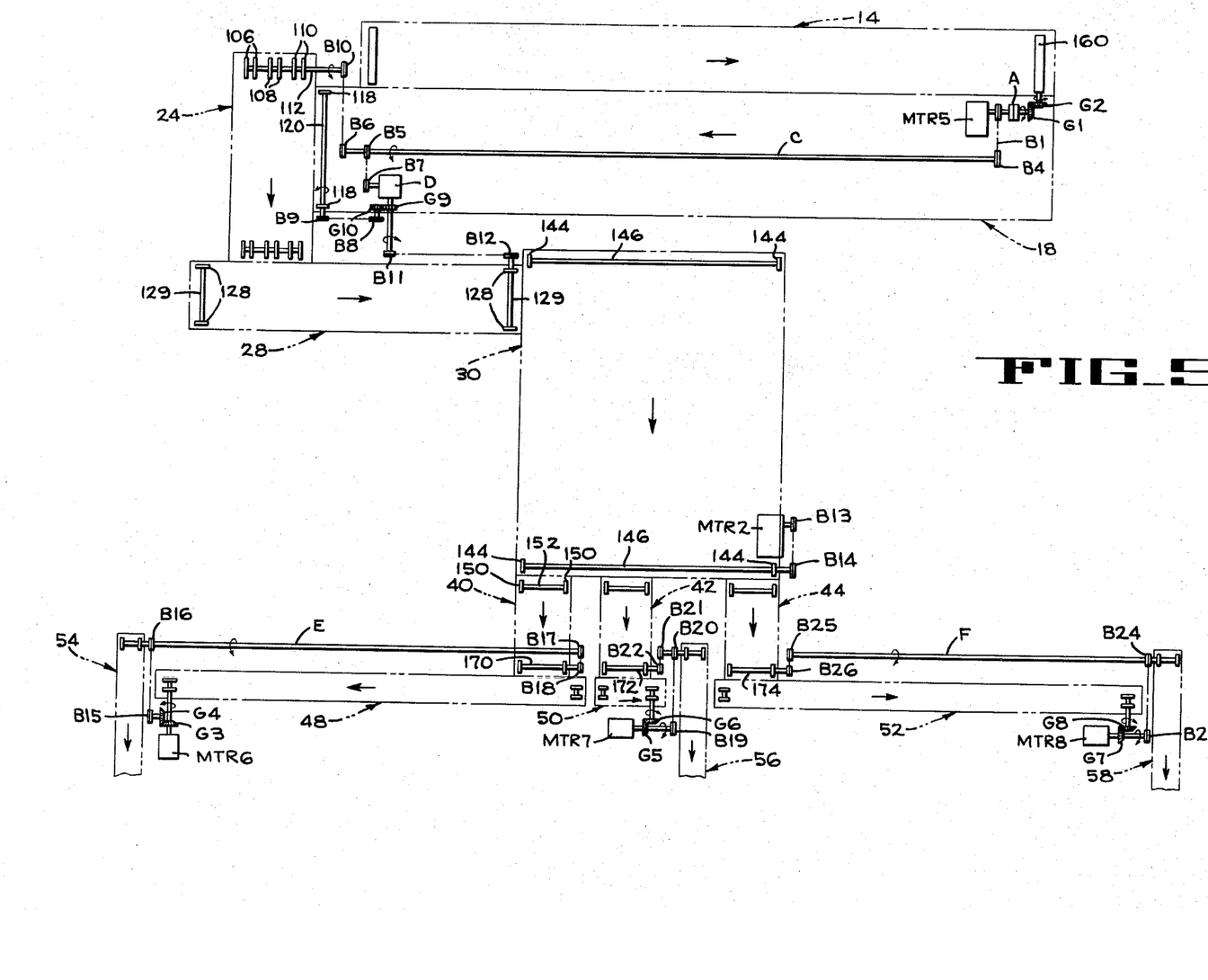
FIG. 9 is a figure that schematically illustrates the way in which the conveyors of the egg processing system of FIG. 1 can be motor driven.

FIG. 9 illustrates, in schematic fashion, a particular arrangement for driving the conveyors of the hereindescribed system. In FIG. 9 it can be seen that the motor MTR5 has a chain B1 rotatably secured to the motor drive shaft. The motor drive shaft is coupled to a power transmission unit A have an output drive shaft and a bevel gear G1 secured thereto. The transmission unit A converts continuous rotation of the output shaft of the motor MTR5 into intermittent rotation of the output drive shaft of the unit A. The bevel gear G1 meshes with a bevel gear G2 on a drive shaft 160 that drives the infeed conveyor 14 in intermittent movements to index flats of eggs to the transfer mechanism 16.

The chain B1 is coupled to a sprocket B4 on a transmission shaft C which has sprockets B5 and B6 mounted thereon. The sprocket B5 is coupled by a chain to a sprocket B7 on the input shaft of a gear reduction unit D which has an output shaft with a gear G9 mounted thereon. The gear G9 meshes with a gear G10 on a drive shaft having a sprocket B8 thereon which sprocket is, in turn, coupled by a chain to a sprocket B9 on the shaft 120 that drives conveyor 18. A sprocket B11 on the output shaft of the unit D is coupled by a chain to a sprocket B12 on the shaft 129 that drives the conveyor 28. The sprocket B6 is coupled by a chain to a sprocket B10 that drives the conveyor 24 through its drive shaft 112.

In FIG. 9 it can further be seen that the motor MTR2 has a sprocket B13 mounted on its drive shaft. The sprocket B13 is coupled by a chain to a sprocket B14 on the drive shaft 146 that drives the slat conveyor of the accumulator device 30. A motor MTR6 (which is a part of the egg breaking machine 60) has a drive shaft which drives the conveyor 48 from the downstream end thereof and which is also provided with a bevel gear G3 thereon. The bevel gear G3 meshes with a bevel gear G4 on a drive shaft that has a sprocket B15 thereon. The sprocket B15 is coupled by a chain to a sprocket B16 on a shaft E. The shaft E provides the driving power for the conveyor 54 and is also provided with a sprocket B17 which is coupled by a chain to a sprocket B18 of a drive shaft 170 at the upper end of the conveyor 40 for driving the chain belts 148.

A motor MTR7 (which is a part of the egg breaking machine 62) has a drive shaft with a bevel gear G5 and a sprocket B19 thereon. The bevel gear G5 meshes with a bevel gear G6 on a drive sahft that drives the belts of the conveyor 50. The sprocket B19 is coupled by a chain to a sprocket B20 on a drive shaft that drives the conveyor 56. The drive shaft having the sprocket B20 thereon also has a sprocket B21 thereon which is coupled by a chain to a sprocket B22 on a drive shaft 172 that drives the chains of the conveyor 42 from the upper end thereof.

A motor MTR8 (which is a part of the egg breaking machine 64) has a drive shaft with a bevel gear G7 and a sprocket B23 thereon which is coupled by a chain to a sprocket B24 on a drive shaft F that drives the conveyor 58. The bevel gear G7 meshes with a bevel gear G8 on a drive shaft that drives the belts of the conveyor 52. The drive shaft F has a sprocket B25 thereon which is coupled by a chain to a sprocket B26 on a drive shaft 174 that drives the chains of the conveyor 44 from the upper end thereof.

When the machine 60 is rendered inoperative, the motor MTR6 is rendered inoperative to thereby halt the movement of the conveyors 40, 48 and 54. When the machine 62 is rendered inoperative, the motor MTR7 is rendered inoperative to thereby halt the movement of the conveyors 42, 50 and 56. When the machine 64 is rendered inoperative, the motor MTR8 is rendered inoperative to thereby halt the movement of the conveyors 44, 52 and 58. The motor MTR6, the motor MTR7 or the motor MTR8 can be made inoperative by operators who can actuate a switch mechanism to turn off the motor when it is desired to stop the operation of the associated machine 60, 62 or 64. The motor MTR2 can be rendered inoperative by opening the switch SW–6 shown in FIG. 8.

MODE OF OPERATION

An operator closes the switch SW–5 to start the operation of the flat washer apparatus FW by energizing the flat washer control circuit and closes the switch SW-3 to start the egg washer apparatus 20 into operation by closing contacts CR-5 and energizing motors MTR3 and MTR4 which drive the various operative components of the washer apparatus. The operator also closes the switch SW-6 to start the egg accumulator device 30 into operation by closing contacts M-2 to the motor MTR2.

When the switch SW-5 is closed, the relay coils CR6 and CR7 are energized so that the relay contacts CR-6 become closed and three normally closed relay contacts CR-7 become open and three normally open relay contacts CR-7 become closed. Motor MTR5 is provided with two separate windings, one winding being energized through the normally open contacts CR-7 and the other winding being energized through the normally closed contacts CR-7, so that the speed of the motor can be varied. When the relay contacts CR-6 are closed the motor MTR5 operates at high speed (with power provided through the normally open contacts CR-7) to drive the conveyors 14, 18, 24 and 28 which are each mechanically coupled to the motor MTR5 and which serve to transport a continuous supply of eggs to the accumulator device 30.

When the switch SW-6 is closed the relay coil M2 is energized to close the relay contacts M-2 so that the motor MTR2 is turned on. When the motor MTR2 is turned on it drives the chain belts 74 of the accumulator device 30 so that the slats 72 are moved across the deck 70 to push the eggs therealong.

When the switches SW-5 and SW-3 are both closed the relay coil CR5, the detergent pump DP, and the solenoid coil SOL-1 are energized. The energized relay coil CR5 closes the relay contacts CR-5 to turn on the motor MTR3 and the motor MTR4. When the motor MTR3 is turned on water is pumped into the egg washer apparatus 20 in order to spary recirculated water onto the eggs moving through the egg washer apparatus on the roller conveyor 18. The motor MTR4 operates to rotate egg scrubbing brushes, contoured to fit egg curvature, arranged within the apparatus 20. The detergent pump DP pumps liquid detergent into the water which sprays the eggs. The energized solenoid coil SOL-1 operates a hot water rinse mechanism used to spray rinse dirt from the eggs with fresh unrecirculated water.

The conveyors 14, 18, 24 and 28 are driven by the motor MTR5. The slat conveyor is driven by the motor MTR2. The conveyors 40, 48 and 54 are driven by a motor MTR6 shown in FIG. 9, the conveyors 42, 50 and 56 are driven by a motor MTR7 shown in FIG. 9, and the conveyors 44, 52 and 58 are driven by a motor MTR8 shown in FIG. 9. The motors MTR6, MTR7 and MTR8 are inoperative when their associated egg breaking machines 60, 62 and 64 are inoperative. If, for example, the egg breaking machine 60 is rendered inoperative the motor MTR6 that drives the conveyors 40, 48 and 54 is rendered inoperative and the movement of these conveyors is halted.

Most of the time all the machines 60, 62 and 64 are operating simultaneously and the normally closed relay contacts TD-1 and TD-2 (FIG. 8) will be closed. When all of the machines 60, 62 and 64 are in simultaneous operation the conveyors 40, 48 and 54 operate to convey eggs to the machine 60, the conveyors 42, 50 and 56 operate to convey eggs to the machine 62, and the conveyors 44, 52 and 58 operate to convey eggs to the machine 64. Under these conditions the number of eggs leaving the accumulator device 30 is about the same as the number of eggs entering the device and eggs will not be accumulated therein so as to actuate either of the limit switches SW-1 or SW-2.

When any one of the machines 60, 62 or 64 is turned off for a time the number of eggs gathered on the deck 70 will increase. If the machine 60, for example, is turned off for a long enough time the eggs gathered on the deck 70 can increase in number until they extend from the outlet region to or beyond the deck location beneath the paddle 80. When eggs extend back to or beyond this location any egg or eggs situated under the paddle 80 will hold the paddle 80 upward for an extended time interval. When the paddle 80 is held upward the switch SW-1 is closed. The relay coil TD1 can thus be continuously energized for an interval in excess of 5 seconds. When the relay coil TD1 is so energized the relay contact TD-1 opens, and the relay coil CR7 becomes deenergized.

When the coil CR7 is deenergized the relay contacts CR-7 operate so that the three normally closed relay contacts CR-7 become closed and the three normally open relay contacts CR-7 become open. This switches the power to MTR5 to the secondary winding. As a result, the speed of the motor MTR5 reduces to low speed, a speed which is two-thirds of the high speed of the motor MTR5, and the conveyors 14, 18, 24 and 28, operated by the motor MTR5, reduce their speed of movement to two-thirds of their regular high speed of movement. Thus, the rate of egg feed to the ramp 32 inlet is reduced by one-third.

In the event that another egg breaking machine, say machine 62, is turned off while the machine 60 is turned off the number of eggs gathered on the deck 70 may increase until the eggs on the deck extend from the outlet region to or beyond the deck location under the paddle 82. In this event, any egg or eggs situated under the paddle 82 will hold the paddle 82 upward for an extended time interval.

When the paddle 82 is held upward the switch SW-2 is closed. The relay coil TD2 can thus be continuously energized for an interval in excess of 5 seconds. When the relay coil TD2 is continuously energized for more than 5 seconds the relay contact TD-2 opens and the relay coils CR5 and CR6 become deenergized to break the power circuit to the motors MTR3, MTR4 and MTR5. Also, when the relay contact TD-2 is open the circuit paths to the detergent pump DP and the solenoid coil SOL-1, are interrupted. Due the opening of the relay contact TD-2, the motor MTR5, which has been operating at low speed, ceases to operate so that the infeed conveyors 14, 18, 24 and 28 come to a halt. The conveyors 14, 18, 24 and 28 remain inoperative so long as both of the switches SW-1 and SW-2 are closed.

The number of eggs gathered on the deck 70 can be decreased during the time that the switches SW-1 and SW-2 are closed. During this time eggs continue to be conveyed from the device 30 to the machine 64 which, for example, may not have been turned off. After the number of eggs on the deck 70 has been decreased to a sufficient extent, the switch SW-2 will open to result in the resumption of low speed operation of the infeed conveyors 14, 18, 24 and 28.

Opening of the switch SW-2 occurs when the egg or eggs on the deck 70 move out of contact with the paddle 82 and the paddle 82 pivots downward. When the paddle 82 pivots downward and the switch SW-2 opens, the relay coil CR5, the detergent pump DP, the solenoid coil SOL-1, and the relay coil CR6 are again energized. Consequently, the motors MTR3, MTR4 and MTR5 resume operation and the motor MTR5 drives the conveyors 14, 18, 24 and 28 at slow speed so long as switch SW-1 remains closed.

The conveyors 14, 18, 24 and 28 operate at slow speed until the number of eggs gathered on the deck 70 decreases until the egg or eggs touching the paddle 80 move from under the paddle so that it pivots downward to open the switch SW-1. The opening of the switch SW-1 deenergizes the relay coil TD1 thereby closing the relay contact TD-1. The closing of the relay contact TD-1 causes the normally open relay contacts CR-7 to become closed and the normally closed relay contacts CR-7 to become open so that the motor MTR5 again drives the conveyors 14, 18, 24 and 28 at high speed.

It is possible to modify certain portions of the system without departing from the principles of the present invention. Thus, for example, it is possible to utilize an egg accumulation device that has a motor driven endless conveyor belt to convey eggs from the inlet region to the outlet region of the device and to utilize this belt in lieu of the slat conveyor to accomplish accumulation of eggs at the outlet region.

The paddles 80 and 82 in the above described system are respectively actuated to slow and then stop the movement of the conveyors 14, 18, 24 and 28. The system can by modified, in a suitable fashion, to include additional paddles, similar to the paddles 80 and 82, which can be actuated to slow the movement of the conveyors 14, 18, 24 and 28. Thus, for example, one additional paddle can be suspended over the deck 70 at a location between the paddles 80 and 82. This additional paddle may be actuated to slow the movement of the conveyors 14, 18, 24 and 28 to one-third the regular high speed conveyor movement, for example, by providing the drive motor MTR5 with three separate stator windings rather than just two. The additional paddle may be actuated before the paddle 82 is actuated and after the paddle 80 is actuated. If this is done, the conveyors 14, 18, 24 and 28 can be moved at high speed, at two-thirds of high speed, at one-third of high speed, or at zero speed. If the system is appropriately modified in the manner indicated it will be possible to move the conveyors 14, 18, 24 and 28 at one-third of high speed at times when two of the machines 60, 62 and 64 are inoperative. By operating the conveyors at one-third of high speed during such times the number of eggs conveyed to the accumulator device 30 during such times will be about the same as the number of eggs conveyed from the device 30 to the particular machine which remains in operation.

Although the best mode contemplated for carrying out the present invention has been herein shown and described, it will be apparent that modification and variation may be made without departing from what is regarded to be the subject matter of the invention.

What is claimed is:

1. An apparatus adapted to convey eggs to a plurality of egg processing machines, the apparatus comprising an egg accumulation device providing an egg accumulation area wherein eggs may accumulate; a conveyor system for transporting eggs from a source of eggs to and from the egg accumulation area of the egg accumulation device, the conveyor system including first conveyor means for conveying eggs to the egg accumulation area of said egg accumulation device, second conveyor means for conveying eggs through the egg accumulation area of the egg accumulation device, and third conveyor means for conveying eggs from the egg accumulation area of the egg accumulation device; the third conveyor means including a conveyor for conveying eggs to a first egg processing machine and including a separate conveyor for conveying eggs to a second egg processing machine; and control means for controlling the first conveyor means so that it may be operated at either a first speed or a second speed, lower than the first speed, or so that it may be halted; said control means including means for operating said first conveyor means at the second speed and including means for halting the first conveyor means; said means for operating said first conveyor means at the second speed being operable to change the speed of the first conveyor means for the first speed to the second speed when the quantity of eggs accumulated in the egg accumulation area of the egg accumulation device increases to a first approximate number of eggs; said means for halting the first conveyor means being operable to halt the first conveyor means when it is operating at the second speed and when the quantity of eggs accumulated in the egg accumulation area of the egg accumulation device increases to a second approximate number of eggs greater in number than the first approximate number of eggs; said egg accumulation device including an inlet to which eggs are conveyed by said first conveyor means and including outlets from which eggs are respectively conveyed by the conveyors of said third conveyor means; said second conveyor means moving said eggs through said egg accumulation device in a generally straight line path, said first conveyor means delivering eggs to said accumulation device at one end thereof in a direction transverse to the direction of said path, and said third conveyor means directing the eggs in paths which are generally in alignment with said straight line path.

2. The apparatus set forth in claim 1 wherein said third conveyor means includes three conveyors extending in parallel and having their inlet ends separated by guide means which diverge toward the conveyors of said third conveyor means.

3. The apparatus set forth in claim 2 wherein said second conveyor means comprises a series of spaced pusher members and a fixed deck over which eggs are pushed by said pusher members and wherein said conveyors of said third conveyor means comprised pocket roller conveyors.

4. The apparatus set forth in claim 3 wherein said pocketed roller conveyors of said third conveyor means are operated to elevate said eggs from said egg accumulation device.

5. An apparatus adapted to convey eggs to a plurality of egg processing machines, the apparatus comprising an egg accumulation device providing an egg accumulation area wherein eggs may accumulate; a conveyor system for transporting eggs from a source of eggs to and from the egg accumulation area of the egg accumulation device, the conveyor system including first conveyor means for conveying eggs to the egg accumulation area of said egg accumulation device, second conveyor means for conveying eggs through the egg accumulation area of the egg accumulation device, and third conveyor means for conveying eggs from the egg accumulation area of the egg accumulation device; the third conveyor means including a conveyor for conveying eggs to a first egg processing machine and including a separate conveyor for conveying eggs to a second egg processing machine; control means for controlling the first conveyor means so that it may be operated at either a first speed or a second speed, lower than the first speed, or so that it may be halted; said control means including means for operating said first conveyor means at the second speed and including means for halting the first conveyor means; said means for operating said first conveyor means at the second speed being operable to change the speed of the first conveyor means from the first speed to the second speed when the quantity of eggs accumulated in the egg accumulation area of the egg accumulation device increases to a first approximate number of eggs; said means for halting the first conveyor means being operable to halt the first conveyor means when it is operating at the second speed and when the quantity of eggs accumulated in the egg accumulation area of the egg accumulation device increases to a second approximate number of eggs greater in number than the first approximate number of eggs; said means for operating said first conveyor means at the second speed including a first switch means for causing said first conveyor means to move at the second speed when the first switch means is continuously actuated for a first predetermined time interval; said means for halting the first conveyor means including a second switch means for causing said first conveyor means to halt its movement when the second switch means is continuously actuated for a second predetermined time interval; a first switch actuator means for actuating said first switch means, said first switch actuator means being disposed adjacent a first portion of the egg accumulation area so as to be continuously actutable by an egg or eggs in the egg accumulation area; and a second switch actuator means for actuating said second switch means, said second switch actuator means being disposed adjacent a second portion of the egg accumulation area so as to be continuously actuatable by an egg or eggs in the egg accumulation area; said first switch actuator means including a pivoted paddle disposed above said first portion of the egg accumulation area for pivoted actuation by eggs moving through said egg accumulation area and said second switch actuator means including a pivoted paddle disposed above said second portion of the egg accumulation area for pivoted actuation by eggs moving through said egg accumulation area.

6. An apparatus for feeding eggs to a plurality of processing machines that operate simultaneously or individually, the apparatus comprising an egg accumulation device having a substantially horizontal surface area upon which eggs can accumulate in a single layer without exerting undue force upon adjacent eggs; a conveyor system including first conveyor means for conveying eggs to the egg accumulation device, second conveyor means for conveying eggs along the egg accumulation device from where they are introduced by the first conveyor to an opposite end of the egg accumulation device from which they are discharged and for arranging the accumulated eggs in a zone extending transversely of the egg accumulation device adjacent the discharge end thereof; third conveyor means including a plurality of conveyors, each conveyor adapted to convey eggs from the discharge end of the egg accumulation device to a separate processing machine; and control means for operating said first conveyor means at a first speed when the quantity of eggs accumulated in the zone is less than a first approximate number, at a second speed lower than the first speed when the quantity of eggs accumulated in the zone exceeds the first approximate number but is less than a second approximate number, and halting the first conveyor means when the quantity of eggs accumulated in the zone exceeds the second approximate number.

7. The apparatus described in claim 6 wherein said control means includes a first sensing means for sensing the presence of eggs upon the horizontal surface area of the egg accumulation device at a distance spaced longitudinally from the discharge end thereof to define a zone extending transversely thereof in which a quantity of eggs representing the first approximate number could be snugly fitted in a single horizontal layer, and a second sensing means for sensing the presence of eggs upon the horizontal surface area of the egg accumulation device at a distance spaced longitudinally from the discharge end thereof to define a transversely extending zone in which a quantity of eggs representing the second approximate number could be snugly fitted in a single horizontal layer.

8. The apparatus described in claim 7 wherein said control means includes a first time delay means requiring said first sensing means to continuously sense the presence of eggs for a predetermined time interval in excess of the normal time required for an egg conveyed by the second conveyor means to travel past the first sensing means before the control means reduces the speed of the first conveyor means, and a second time delay means requiring said second sensing means to continuously sense the presence of eggs for a preset period of time in excess of the normal time required for an egg conveyed by the second conveyor means to travel past the second sensing means before the control means halts the first conveyor means.

* * * * *

UNITED STATES PATENT OFFICE
CERTIFICATE OF CORRECTION

PATENT NO. : 3,759,368
DATED : September 18, 1973
INVENTOR(S) : BOYD W. ROSE; GEORGE W. THORNTON It is certified that error appears in the above-identified patent and that said Letters Patent are hereby corrected as shown below:

Column 7, line 2, "The" should be --the--.

Column 7, line 51, "bolts" should be --belts--.

Column 10, line 32, "sahft" should be --shaft--.

Column 11, line 38, "spary" should be --spray--.

Column 13, line 34, "by" should be --be--.

Signed and sealed this 6th day of May 1975.

(SEAL)
Attest:

RUTH C. MASON
Attesting Officer

C. MARSHALL DANN
Commissioner of Patents
and Trademarks